US008820178B2

(12) United States Patent
Ayers et al.

(10) Patent No.: US 8,820,178 B2
(45) Date of Patent: Sep. 2, 2014

(54) SELF-DIAGNOSING DIFFERENTIAL PRESSURE FLOW METER

(75) Inventors: Jared Steven Ayers, Menifee, CA (US);
Gerald E. Davis, Hemet, CA (US);
Clinton Paul Hobbs, Hemet, CA (US);
Eric Dahl Mikkelsen, Hemet, CA (US)

(73) Assignee: McCrometer, Inc., Hemet, CA (US)

( * ) Notice: Subject to any disclaimer, the term of this patent is extended or adjusted under 35 U.S.C. 154(b) by 179 days.

(21) Appl. No.: 13/607,259

(22) Filed: Sep. 7, 2012

(65) Prior Publication Data
US 2014/0069208 A1 Mar. 13, 2014

(51) Int. Cl.
*G01F 1/34* (2006.01)
(52) U.S. Cl.
USPC ........................................ 73/861.42
(58) Field of Classification Search
USPC .............. 73/861.42, 861.52, 716, 861.22
See application file for complete search history.

(56) References Cited

U.S. PATENT DOCUMENTS

| 5,814,738 | A * | 9/1998 | Pinkerton et al. | 73/861.55 |
|---|---|---|---|---|
| 7,752,929 | B2 * | 7/2010 | Kurz | 73/863 |
| 8,136,410 | B2 | 3/2012 | Hobbs et al. | |
| 8,136,414 | B2 | 3/2012 | Steven | |
| 8,448,525 | B2 * | 5/2013 | Wehrs et al. | 73/861.52 |
| 2004/0129084 | A1 * | 7/2004 | Ikeda | 73/716 |
| 2006/0053902 | A1 * | 3/2006 | Good et al. | 73/861.52 |
| 2011/0259119 | A1 * | 10/2011 | Steven | 73/861.42 |
| 2014/0069209 | A1 * | 3/2014 | Ayers et al. | 73/861.52 |

FOREIGN PATENT DOCUMENTS

| EP | 0255056 A2 | 2/1988 |
|---|---|---|
| GB | 2411476 A | 8/2005 |
| GB | 2453704 | 2/2011 |

OTHER PUBLICATIONS

Steven, Richard, "Diagnostic Capabilities of [increment] Cone Meters", CEESI Publications, Aug. 12, 2009, 22 pages, 7th International Symposium on Fluid Flow Measurement, 2009. Available at: http://library.ceesi.com/docs_library/ceesi-publications/1105_DiagnosticCapabilities.pdf, last accessed Feb. 26, 2014.
Wolfgang, Nitsche; Brunn, Andre, "Stroemungsmesstechnik", Dec. 31, 2006, 6 pages, Springer, Berlin.
International Search Report for Application PCT/US2013/058168, Nov. 20, 2013, 4 pages, European Patent Office, The Hague, Netherlands.

\* cited by examiner

*Primary Examiner* — Jewel V Thompson
(74) *Attorney, Agent, or Firm* — Ference & Associates LLC

(57) ABSTRACT

An aspect provides a method of metering flow through a fluid conduit having an obstruction therein, including: placing an obstruction body within the conduit; generating at least two differential pressure measurement signals using at least three different pressure ports, said at least three different pressure ports comprising: an upstream pressure port; a downstream pressure port; and an auxiliary pressure port; wherein at least one of the upstream pressure port, the downstream pressure port, and the auxiliary pressure port is positioned at an angle between 0 and 90 degrees with respect to a conduit wall; establishing a baseline relationship between the at least two differential pressure measurement signals; and determining if the baseline relationship between the at least two differential pressure measurement signals differs by a predetermined amount. Other aspects are described and claimed.

20 Claims, 3 Drawing Sheets

SELF-DIAGNOSING DIFFERENTIAL PRESSURE FLOW METER

BACKGROUND

Flow meters are important in many applications, such as oil and gas pipeline flow monitoring. It is important for economic and safety reasons to have accurate flow measurements. Differential pressure flow meters are commonly used. A differential flow meter is based on Bernoulli's theorem and the conservation of mass of a fluid flow between two points in a flow, and can provide a flow rate reading (in mass or volume) expressed as a function of measured differential pressure and the fluid density.

A differential pressure meter measures a pressure drop produced using a differential pressure producer, such as an obstruction body or constriction introduced into the fluid flow. The differential pressure meter provides a flow rate calculated using known flow rate equations. For its part, the differential pressure producer may be either a constriction formed in the conduit or an obstruction body inserted into the conduit. Examples of differential pressure meters include the McCrometer WAFER CONE flow meter and the McCrometer V CONE flow meter, which operate using obstructions. V CONE and WAFER CONE are registered trademarks of McCrometer in the United States and other countries.

In order to measure pressure differential within a conduit, pressure tappings or ports are configured both upstream from the obstruction and at or in the vicinity of the obstruction in order to produce high and low pressure readings. The differential in pressure between the two pressure points is monitored and used for flow rate calculations. The standard DP meter flow equation is well known.

BRIEF SUMMARY

In summary, one aspect provides a method of metering flow through a fluid conduit, comprising: generating at least a primary differential pressure measurement signal and an auxiliary differential pressure measurement signal using at least three different pressure ports, said at least three different pressure ports comprising: a pressure port providing a high pressure signal; a pressure port providing a low pressure signal; and an auxiliary pressure port providing an auxiliary pressure signal and positioned at an angle between 0 and 90 degrees with respect to a wall of the fluid conduit; establishing a baseline relationship between the primary differential pressure measurement signal and the auxiliary differential pressure measurement signal; and determining a second baseline relationship between the primary differential pressure measurement signal and the secondary differential pressure measurement signal.

Another aspect provides a flow metering apparatus, comprising: a fluid conduit having a differential pressure producer therein; a pressure port providing a high pressure signal; a pressure port providing a low pressure signal; and an auxiliary pressure port providing an auxiliary pressure signal and positioned at an angle between 0 and 90 degrees with respect to a wall of the fluid conduit; wherein the pressure port providing a high pressure signal, the pressure port providing a low pressure signal, and the auxiliary pressure port providing an auxiliary pressure signal generate at least a primary differential pressure measurement signal and an auxiliary differential pressure measurement signal.

A further aspect provides a flow metering apparatus, comprising: a fluid conduit having a differential pressure producer therein; a pressure port providing a high pressure signal; a pressure port providing a low pressure signal; an auxiliary pressure port providing an auxiliary pressure signal and positioned at an angle between 0 and 90 degrees with respect to a wall of the fluid conduit; wherein the pressure port providing a high pressure signal, the pressure port providing a low pressure signal, and the auxiliary pressure port providing an auxiliary pressure signal generate at least a primary differential pressure measurement signal and an auxiliary differential pressure measurement signal; and a component configured to generate an indication responsive to determining that a relationship between the primary differential pressure measurement signal and the auxiliary differential pressure measurement signal has changed over time.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
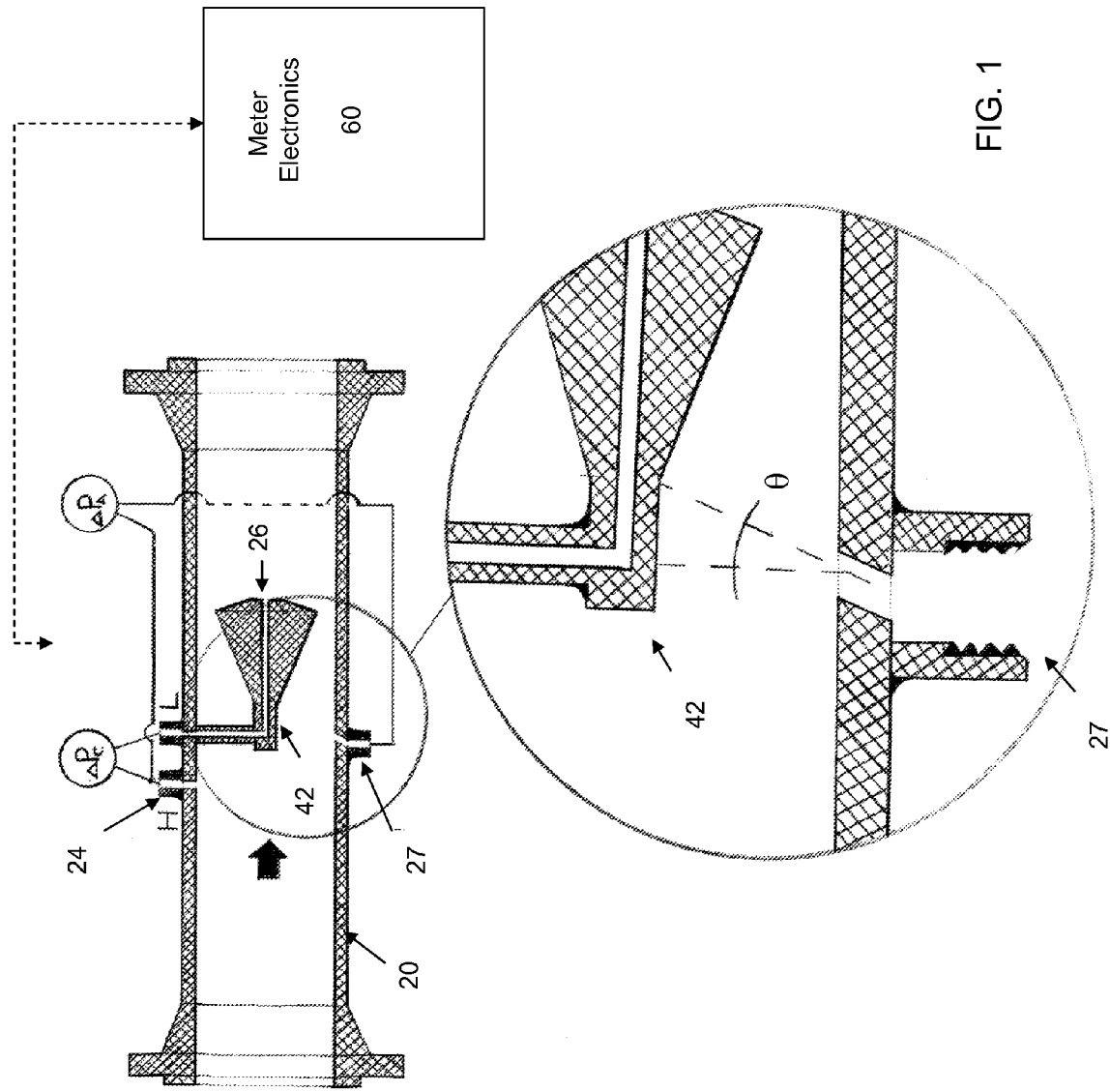
FIG. 1 illustrates an example angled port differential pressure flow meter.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Measuring differential pressure in a conduit produced using an obstruction or constriction (hereinafter collectively "differential pressure producer") and estimating flow with a differential pressure meter is known. Consequently, the various algorithms and processing associated therewith are known to those having ordinary skill in the art and a description of these measurement algorithms and principles is omitted for the sake of brevity. Information regarding differential pressure meters and techniques of using the same may be found in: U.S. Pat. No. 5,814,738; and U.S. Patent Pub. No. 2011/0259119, the entire contents of which are incorporated by reference here.

Providing one or more of the pressure ports at an angle is both unorthodox and counterintuitive, as described in the co-pending and commonly assigned U.S. patent application Ser. No. 13/607,193 entitled "ANGLED PORT DIFFERENTIAL PRESSURE FLOW METER", filed concurrently herewith, which is incorporated by reference herein.

An embodiment provides one or more pressure ports at an angle. For example, referring to FIG. 1, an embodiment provides an auxiliary pressure port 27 at an angle. The orthodox understanding is that a pressure port measures the static pressure at the pipe wall. Thus, providing the pressure port 27 at an angle would not seem to give any particular effect to the pressure measurements, other than introducing possible impact effects. However, if the pressure measurement point is not at the pipe wall, but is instead extended across the tube of flow and reads the pressure along that line, that is, in effect, the pressure measurement "point" is the pressure gradient along that line, providing angled port 27 does provide a beneficial effect in such arrangements.

An embodiment uses an auxiliary pressure port 27 to provide a mechanism to diagnose a defective or inaccurate meter. In conventional differential pressure meter arrangements, it is often difficult to identify that there is an error in the readings produced. Thus for example, if a differential pressure meter in a natural gas conduit becomes fouled and thus changes the shape of the obstruction body or member 42, such as changing the shape of the cone, the differential pressure readings will be changed, leading to changed flow measurement calculations, even though the overall flow through the conduit 20 has not changed. In addition to fouling, other changes may introduce error. For example, the differential pressure producer (in this example, an obstruction body or member 42) may be physically damaged on installation, changing its shape and thus its introduction of a pressure drop for flow estimation. Again, any change in shape, either by buildup/fouling, wearing/erosion, or physical damage, may introduce a change in the flow generally, thus causing a change in differential pressure reading when the overall flow has not changed. Naturally, this will lead to inaccurate flow measurement, which can have negative impacts such as lost revenue, et cetera.

Accordingly, an embodiment as illustrated in FIG. 1 provides a flow meter in which an auxiliary pressure port 27 is provided in addition to conventional upstream 24 and downstream pressure ports 26 (the locations of the various ports are illustrative examples in FIG. 1). The upstream pressure port 24 and the auxiliary pressure port 27 provide signals used to establish a first differential pressure measurement signal or reading. The upstream pressure port 24 and the downstream pressure port 26 provide signals used to establish a second differential pressure measurement signal or reading. An embodiment uses the relationship between first and the second differential pressure measurement signals or readings to detect if a problem has arisen in the system affecting the readings of the differential pressure meter. By establishing a baseline relationship between the first and second differential pressure measurement signals or readings, an embodiment may be used to generate an alarm in the event that the relationship changes by a predetermined amount.

In FIG. 1 an example embodiment provides a diagnostic system with a cone type obstruction body or member 42, with the understanding that the principles and characteristics of the embodiments described herein apply to any differential pressure flow meter. In one example, the embodiment has three main components: 1) a primary (conventional) differential pressure measurement signal ($\Delta P_C$) generated using high/upstream pressure port 24 and low/downstream pressure port 26; 2) an auxiliary pressure signal ($\Delta P_A$) generated using high/upstream pressure port 24 and auxiliary pressure port 27, and 3) meter electronics 60, which may include a signal processor, memory and the like, as further described herein.

For ease of description, the auxiliary pressure signal is not described extensively in connection with measuring the recovery differential pressure and is not used to calculate a flow rate in the example embodiments, but the auxiliary pressure signal may be used to calculate a flow rate if desired. The flow rate in the described example embodiments is calculated using the primary differential pressure measurement signal in a conventional way for ease of description.

An embodiment combines the primary differential pressure measurement signal, derived from the upstream pressure port 24 and the downstream pressure port 26, and the auxiliary pressure signal, derived from the upstream pressure port 24 and the auxiliary pressure port 27, to determine the operational health of the differential pressure flow meter and report that to a user via the meter electronics 60. When the flow meter is installed into the conduit 20, an embodiment reads the primary/conventional differential pressure measurement signal as in normal operation. The auxiliary differential pressure measurement signal will be generated by combining the high pressure/upstream pressure port 24 (also termed static pressure port) with the auxiliary pressure port 27. In the example of FIG. 1, the auxiliary pressure port 27 is positioned upstream of the throat of the obstruction body or member 42 in the differential pressure system, although as described it may be located elsewhere.

The auxiliary differential pressure measurement signal is derived from an angled auxiliary pressure port 27 that is some angle θ that is less than 90 degrees and greater than 0 degrees (i.e., between 0 degrees and 90 degrees) from perpendicular to the header pipe 20. This is done intentionally to boost the differential pressure measurement signal between the auxiliary pressure port 27 and the high pressure/upstream pressure port 24. In the example embodiment of FIG. 1, the traditional upstream pressure port 24 and a downstream pressure port 26, such as used in connection with the McCrometer V CONE flow meter, are left unaltered, although this is not a requirement. While specific angles and ranges of angles are provided herein as examples, any angle may be chosen that provides the functionality described herein. Particularly, an angle that is less than 90 degrees but greater than 0 degrees may be used, or an angle between 15 degrees and 75 degrees may be used, or an angle between 30 and 50 degrees may be used.

Figure 2:
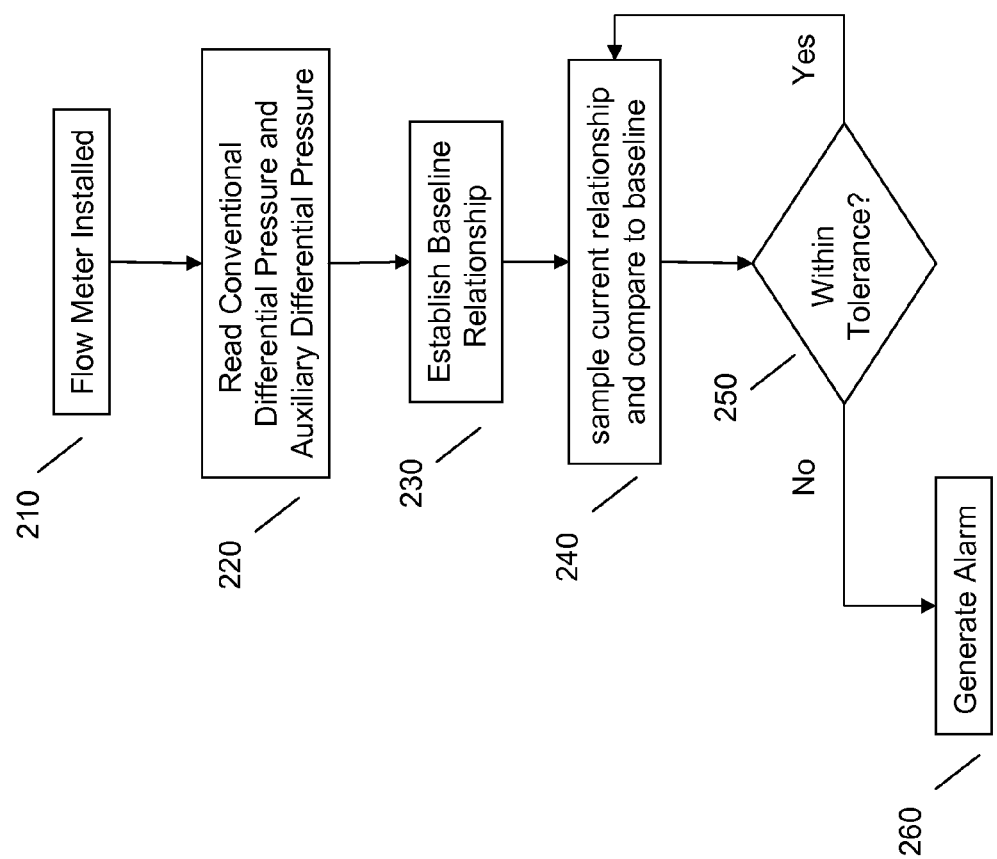
FIG. 2 illustrates an example method for monitoring performance of a differential pressure flow meter using an auxiliary pressure port.

In FIG. 2, an example method of self calibration and monitoring is illustrated. An embodiment provides a system that is self-calibrating during start-up in the in-service line. For example, upon installation and start-up 210, the flow algorithm establishes a baseline by taking sample sets of the conventional/primary differential pressure measurement signal (using pressure readings derived from the upstream 24 and downstream 26 pressure ports) and the auxiliary differential pressure measurement signal (using pressure readings derived from the upstream 24 and auxiliary pressure ports 27) at 220. This establishes a baseline relationship between the differential pressure measurement signals 230. The baseline relationship may be stored in the meter electronics 60 memory, may be unique to each flow meter, and may operate for the life of the meter.

After a determined time or following such a startup-calibration process, the meter electronics 60 may lock the baseline relationship and begin sampling 240 the flow, sampling the current relationship and comparing it to a baseline relationship, checking for a change in the relationship 250. If a change in the relationship is detected outside of any predetermined tolerances specified, then it is determined that something has changed with the meter. An embodiment may then signal that the change has occurred, for example by generating an alarm or other indication or warning 260. Otherwise, an embodiment may continue to sample on a continuous, intermittent, or periodic basis.

Referring back to FIG. 1, of note is the angled auxiliary pressure port 27. Use of an angled pressure port such as auxiliary pressure port 27 illustrated in FIG. 1 is unorthodox in the context of differential pressure measurement and unorthodox generally in the flow measurement field. In an example embodiment, the auxiliary pressure port 27 is placed such that it is angled and faces downstream (away from flow) and toward the obstruction body or member 42, as illustrated. While other configurations may be acceptable, it has been determined that having the auxiliary pressure port 27 placed at an angle of about 30 degrees, facing the obstruction body or member 42 and downstream provides a reciprocal, divergent pressure differential signal that magnifies a change in the meter's geometry.

The differential pressure readings generated from the three pressure ports, as described herein, are used to establish a baseline relationship between the signals and to monitor for changes in this baseline relationship. It will be readily understood that an embodiment may include an appropriately equipped information handling device or other computer or circuitry, termed herein meter electronics 60, that provides the functionality described herein with respect to implementing differential pressure and flow rate determination algorithms, including establishing and monitoring the baseline relationship between the differential pressure measurement signals generated using the at least three pressure ports described herein. Moreover, embodiments or components thereof may be implemented as a system, method, apparatus or program product. Accordingly, various embodiments may take the form of an entirely hardware embodiment, an entirely software embodiment (including firmware, resident software, micro-code, et cetera) or an embodiment combining software and hardware aspects. Furthermore, embodiments may take the form of a program product embodied in one or more device readable medium(s) having program code embodied therewith.

Any combination of one or more device readable medium (s) may be utilized. The medium may be a storage medium. A storage medium in this regard may be, for example, but not limited to, an electronic, magnetic, optical, electromagnetic, infrared, or semiconductor system, apparatus, or device, or any suitable combination of the foregoing. A device readable storage medium in the context of this document may be any non-signal medium that can contain or store a program for use by or in connection with an instruction execution system, apparatus, or device.

Program code for carrying out operations of various embodiments may be written in any combination of one or more programming languages. The program instructions may be provided to a processor of a device to produce a machine, such that the instructions, which execute via the processor of the device implement the functions/acts specified.

These program instructions may also be stored in a device readable medium that can direct a device to function in a particular manner, such that the instructions stored in the medium produce an article of manufacture including instructions which implement the function/act specified. The program instructions may also be loaded onto a device to produce a device implemented process such that the instructions which execute on the device provide processes for implementing the functions/acts specified.

Figure 3:
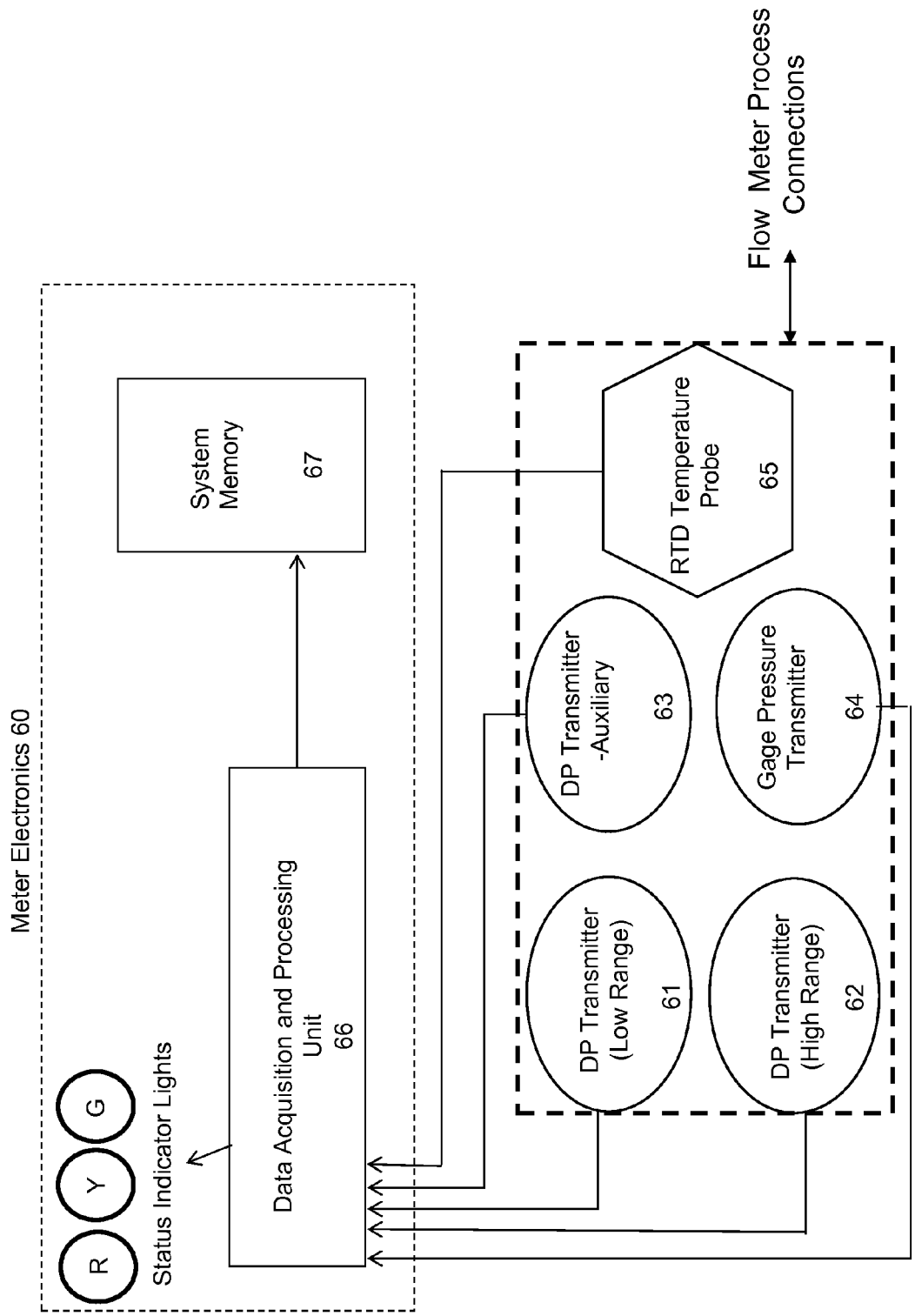
FIG. 3 illustrates example meter electronics.

In this regard, FIG. 3 illustrates a non-limiting example of meter electronics 60 and related flow meter process components. In this example, appropriate connections with the flow meter process (i.e. the conduit 20 and pressure ports 24, 26 and/or 27) provide pressure signals to corresponding transmitters 61-64 and temperature probe 65. The transmitters 61-64 correspondingly provide data signals to a data acquisition and processing unit 66 of meter electronics 60. The pressure determinations calculated by the data acquisition and processing unit 66 may be stored in memory 67, and may be further utilized to provide a readout through an interface, such as red (R), yellow (Y) and green (G) status lights indicating the current status of the monitoring procedure for the baseline relationship (e.g., green displayed to indicate detected baseline and current relationship within a given tolerance, yellow displayed in response to detection of baseline and current relationship approaching a predetermined variance limit, and red displayed in response to detecting the baseline and current relationship is outside of a given tolerance).

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A method of metering flow through a fluid conduit, comprising:
   generating at least a primary differential pressure measurement signal and an auxiliary differential pressure measurement signal using at least three different pressure ports, said at least three different pressure ports comprising:
   a pressure port providing a high pressure signal;
   a pressure port providing a low pressure signal; and
   an auxiliary pressure port providing an auxiliary pressure signal and positioned at an angle between 0 and 90 degrees with respect to a wall of the fluid conduit;
   establishing a baseline relationship between the primary differential pressure measurement signal and the auxiliary differential pressure measurement signal; and
   determining a second baseline relationship between the primary differential pressure measurement signal and the secondary differential pressure measurement signal.

2. The method of metering flow through a fluid conduit of claim 1, further comprising the step of comparing the first baseline relationship to the second baseline relationship.

3. The method of metering flow through a fluid conduit of claim 2, further comprising the step of providing an indication in response to the first baseline relationship and the second baseline relationship differing by a predetermined amount.

4. The method of metering flow through a fluid conduit of claim 3, further comprising the step of generating an alarm in response to the first baseline relationship and the second baseline relationship differing by at least one of the predetermined amount and another predetermined amount.

5. The method of metering flow through a fluid conduit of claim 4, wherein the first predetermined amount and the another predetermined amount are different.

6. The method of metering flow through a fluid conduit of claim 1, wherein the fluid conduit has an obstruction body disposed therein.

7. The method of metering flow through a fluid conduit of claim 6, wherein the auxiliary pressure port is angled downstream and toward said obstruction body.

8. The method of claim 7, wherein the auxiliary pressure port is located between the pressure port providing a high pressure signal and the pressure port providing a low pressure signal.

9. A flow metering apparatus, comprising:
a fluid conduit having a differential pressure producer therein;
a pressure port providing a high pressure signal;
a pressure port providing a low pressure signal; and
an auxiliary pressure port providing an auxiliary pressure signal and positioned at an angle between 0 and 90 degrees with respect to a wall of the fluid conduit;
wherein the pressure port providing a high pressure signal, the pressure port providing a low pressure signal, and the auxiliary pressure port providing an auxiliary pressure signal generate at least a primary differential pressure measurement signal and an auxiliary differential pressure measurement signal.

10. The flow metering apparatus of claim 9, further comprising a component configured to:
establish a baseline relationship between the primary differential pressure measurement signal and the auxiliary differential pressure measurement signal; and
determine a second baseline relationship between the primary differential pressure measurement signal and the secondary differential pressure measurement signal.

11. The flow metering apparatus of claim 10, wherein the component is further configured to compare the first baseline relationship to the second baseline relationship.

12. The flow metering apparatus of claim 11, wherein the component is further configured to provide an indication in response to the first baseline relationship and the second baseline relationship differing by a predetermined amount.

13. The flow metering apparatus of claim 12, wherein the component is further configured to generate an alarm in response to the first baseline relationship and the second baseline relationship differing by at least one of the predetermined amount and another predetermined amount.

14. The flow metering apparatus of claim 13, wherein the first predetermined amount and the another predetermined amount are different.

15. The flow metering apparatus of claim 9, wherein the differential pressure producer comprises a constriction within the fluid conduit.

16. The flow metering apparatus of claim 9, wherein the differential pressure producer comprises an obstruction body disposed within the fluid conduit.

17. The flow metering apparatus of claim 16, wherein the auxiliary pressure port is angled downstream and toward said obstruction body.

18. The flow metering apparatus of claim 17, wherein the auxiliary pressure port is located between the pressure port providing a high pressure signal and the pressure port providing a low pressure signal.

19. The flow metering apparatus of claim 9, wherein one or more of the pressure port providing a high pressure signal and the pressure port providing a low pressure signal is positioned at an angle between 0 and 90 degrees with respect to a wall of the fluid conduit.

20. A flow metering apparatus, comprising:
a fluid conduit having a differential pressure producer therein;
a pressure port providing a high pressure signal;
a pressure port providing a low pressure signal;
an auxiliary pressure port providing an auxiliary pressure signal and positioned at an angle between 0 and 90 degrees with respect to a wall of the fluid conduit;
wherein the pressure port providing a high pressure signal, the pressure port providing a low pressure signal, and the auxiliary pressure port providing an auxiliary pressure signal generate at least a primary differential pressure measurement signal and an auxiliary differential pressure measurement signal; and
a component configured to generate an indication responsive to determining that a relationship between the primary differential pressure measurement signal and the auxiliary differential pressure measurement signal has changed over time.

* * * * *